UNITED STATES PATENT OFFICE.

ERNST STERN, OF HANOVER, GERMANY.

METHOD OF PRODUCING VEGETABLE ADHESIVES.

1,412,020.     Specification of Letters Patent.     Patented Apr. 4, 1922.

No Drawing.     Application filed March 24, 1915. Serial No. 16,772.

(GRANTED UNDER THE PROVISIONS OF THE ACT OF MARCH 3, 1921, 41 STAT. L., 1313.)

*To all whom it may concern:*

Be it known that I, Dr. ERNST STERN, a subject of the King of Prussia, residing at Hanover, in Prussia, German Empire, have invented a certain new and useful Method of Producing Vegetable Adhesives, of which the following is a specification.

My invention relates to a method of producing vegetable adhesives, and its object is to reduce the costs of such production as well as to obtain products superior in quality.

In order to produce adhesives from starch or substances containing starch this latter is decomposed with alkalis and more especially with caustic soda or potash. The products obtained after this manner have a great agglutinant power and are extensively used under the name of gluten or vegetable glue. Now in order to carry this process through and to obtain adhesives fit for practical use it has proved necessary to employ certain rather big quantities of an alkali. If this prescription is disregarded, the decomposition of the material remains incomplete and the adhesive obtained will after some time be converted into a pastry substance absolutely unfit for use.

Now it has been ascertained that it is possible to reduce the quantity of alkali necessary for decomposing starch very considerably, if the decomposition is carried through under pressure.

If starch-paste is heated in a closed vessel under pressure say to 125 to 130° degr. C., the starch is temporarily liquefied, but no adhesive is formed, as after the solution obtained has cooled down, the starch which has been seemingly dissolved separates out again to the greater part and the entire solution coagulates into a jelly-like mass.

If it is proposed to convert the starch into sugar by aid of diastase (as in the manufacture of spirits), this coagulation is of no avail as the starch is, before coagulation can take place, decomposed further by the diastase.

On even very small quantities of acid being added the result will always be a conversion of the starch into sugar.

The result of the process will be altogether different if very small quantities of an alkali are allowed to act under pressure on the raw material. If the process is modified in this way, colloidal solutions of starch are obtained which are absolutely durable and possess extraordinary agglutinant qualities. Minute quantities of an alkali will produce this favorable effect.

While the conversion of starch under ordinary pressure, in order to produce adhesives, necessitates the addition of at least 2 per cent alkali, with increased pressure such as 5 atmospheres, or at least a pressure greater than 3 atmospheres and less than 15 atmospheres, only ¼ to ½ per cent alkali, and even less, of the starch are required.

Consequently instead of caustic soda or potash a great number of salts having an alkaline reaction may be employed. Under ordinary pressure the conversion of starch into adhesives permanently fit for use by aid of carbonate, silicate or phosphate of soda is impossible, whereas, if increased pressure is applied, no difficulty is encountered. Weaker bases such as ammonia, further ammonium salts and organic bases may be employed also.

Preferably the process is carried out in an indifferent atmosphere (steam, nitrogen or the like). In some cases, however, an oxidizing atmosphere may prove useful.

The process may further be carried out with advantage in the following way: the starch is first subjected to high pressure in a neutral solution; namely, the starch with an admixture of water but without alkali; whereby the starch is converted into a soluble condition. After this conversion is completed, very small quantities of hydroxyl ions in the form of an alkali or of salts having an alkaline reaction are added to the hot solution.

In this modification of the process, the starch is thus first dissolved and only then does the treatment for obtaining the adhesive commence. This modified process has the advantage that no discolorations occur.

The adhesives obtained after this manner are distinguished by a very high agglutinant power and a high degree of fluidity. Their practically immaterial content of alkali renders them especially valuable as compared with a great number of other vegetable adhesives.

The adhesives obtained after the process described are intended to be used in the first line as glue for wood. The principal qualities required for glue and which make the glue adapted to glue wood together in the cold, are a superior spreading capacity in combination with a high agglutinant power. In general these two qualities are not to be found in combination; if a cold-glue possesses the spreading capacity required for wood, it is generally lacking agglutinant power, and vice versa. In order to overcome this difficulty the process may be modified as follows:

It has been ascertained that the xanthogenates or xanthic acid compounds of carbohydrates, and more especially of starch and cellulose, are apt to endow the cold-glues with the superior spreading capacity required, without however depriving them of their high agglutinant power. If viewed in the light of colloidal chemistry, the xanthogenates may be said to form the sols which after having been spread upon the surfaces of wood to be glued, will be converted by the action of air into gels having a very high agglutinant power. The xanthogenates of carbohydrates that are decomposed by hydrolysis or oxidation have proved to be especially adapted for this purpose, especially when such are employed mixed with starch. The thiocarbonate and starch form mutually a system of protecting colloids, for while either the thiocarbonate or starch alone readily passes over from the sol condition into the gel condition, this is not the case with the mixture. The change into the gel condition, on the other hand, occurs only when the adhesive has been applied. This circumstance materially influences the durability of the wood-adhesive.

The process may further be carried out in the following manner: starch is subjected to a limited decomposing treatment and the starch thus partly decomposed is converted, partly, into the xanthogenate by allowing carbon disulphide to act upon it. According to the degree of decomposition of the starch and to the percentage of partly decomposed starch converted into xanthogenates (thiocarbonate) the spreading and gluing capacities of the product obtained will be more or less pronounced.

To the starch-xanthogenate-glue a certain quantity of the corresponding cellulose compound may be added.

The compounds mentioned above are distinguished by their extraordinary capacity for jellification, this capacity being characteristic for an adhesive adapted to be used for gluing wood. Of course this capacity of forming jellies should be made use of in such a way as to furnish a fluid glue permanently ready for use.

The following are examples of methods of carrying out the process.

*Example I.*

200 kg. of starch is stirred thoroughly with 200 kg. of water and brought by heating at 60° C. to the swollen condition. The swollen starch is then converted into its alkali compound by the addition, while the swollen starch is continually stirred, of 15 kg. of caustic soda dissolved in 75 kg. of water. Thereupon carbon disulphide, for example 7.5 kg. thereof, while being kept quite cool, is added while the mass is subjected continually to mechanical motion. By observing a temperature of not above 25° C., the formation of the thiocarbonate is completed in a few hours, and the progress of the reaction can be observed readily, in that the odor of carbon disulphide lessens and finally disappears altogether. The product of the process is a wood-glue of excellent qualities and durability.

The process may be modified by exposing the swollen starch, while in an autoclave provided with a stirring device, for about three hours to steam pressure of 5 atmospheres, for example. By this treatment, the starch gel passes over into a starch sol, and the conversion into the thiocarbonate results from the following treatment with alkali and carbon disulphide.

*Example II.*

200 kg. starch is mixed with 225 kg. of water into a mash and dissolved by the addition of 15 kg. of soda lye in 75 kg. of water. After solution has been effected, the temperature is lowered to 40° C. and from 1 to 3 kg. of a powerful diastatic malt extract, and in addition thereto 2 kg. of 3% peroxide of hydrogen, are added thereto. Instead of this procedure, the decomposition may be brought about purely by oxidation, by adding from 2 to 4 kg. of 3% peroxide of hydrogen. The temperature is gradually increased to 65° and the ingredients are kept at that temperature for one hour. Then they are cooled down to from 20 to 25° and the reduction into thiocarbonate is effected by the addition of from 8 to 10 kg. of disulphide of carbon.

*Example III.*

2 kg. of cellulosic material is steeped in 6 kg. of 30% soda lye and the ingredients are left undisturbed for twenty-four hours. The soda lye is then squeezed off to such an extent that the weight of the alkaline-cellulose amounts to approximately 6 kg. 2 kg. of carbon disulphide is subsequently added thereto and after the lapse of a few hours 6 kg. of water is added. The viscous solution is subsequently purified through precipitation with a solution of common salt and is then steeped in the smallest possible quantity of water, to which latter small quantities of soda lye may be added, if necessary.

On the other hand, 200 kg. of starch is converted into the alkaline compound, in the manner described in Example I. 20 to 50 kg. of the purified cellulose solution is applied to the prepared alkaline starch that is being constantly stirred at a temperature of not more than 25°, care being taken that a uniform mixing of all the ingredients is effected.

I claim:—

1. Method of producing vegetable adhesives which consists in heating carbohydrates of starch-like character under a pressure of from three to fifteen atmospheres with between one-half and one per cent of compounds having an alkaline reaction.

2. Method of producing vegetable adhesives which consists in heating carbohydrates of starch-like character under a pressure of from three to fifteen atmospheres with less than one per cent of compounds having an alkaline reaction.

3. Method of producing vegetable adhesives which consists in partially decomposing a starch-like carbohydrate under the combined action of heat, pressure and minute quantities of an alkaline compound not exceeding one per cent of the carbohydrate, and converting the partially decomposed carbohydrate into the corresponding xanthogenate.

4. Method of producing vegetable adhesives which consists in partially decomposing a starch-like carbohydrate under the combined action of heat, pressure and minute quantities of an alkaline compound not exceeding one per cent of the carbohydrate, and treating the partially decomposed carbohydrate with carbon disulphide.

5. As a new industrial product, an adhesive consisting of a mixture of a starch-like carbohydrate and the corresponding xanthogenate.

6. The process for the production of a wood-glue which consists in partially decomposing a carbohydrate and converting the new product into the corresponding xanthogenate.

7. The process for the production of a wood-glue which consists in mixing a starch-like carbohydrate and the corresponding xanthogenate in such proportions that they mutually form a system of protecting colloids which normally prevent any change from the sol condition to the gel condition.

8. As a new industrial product, an adhesive consisting of a mixture of a starch-like carbohydrate and the corresponding xanthogenate in such proportions that they mutually form a system of protecting colloids which normally prevent any change from the sol condition into the gel condition.

In testimony whereof I have signed my name to this specification in the presence of two subscribing witnesses.

Dr. ERNST STERN.

Witnesses:
Hans Schultze,
Henry Reed.